(12) United States Patent
Muramatsu et al.

(10) Patent No.: US 10,379,467 B2
(45) Date of Patent: Aug. 13, 2019

(54) COMPACT FIXING DEVICE WITH REDUCED COST OF WIRING INCLUDING ELECTRICAL CABLES

(71) Applicant: CANON KABUSHIKI KAISHA, Tokyo (JP)

(72) Inventors: Motoyasu Muramatsu, Susono (JP); Keigo Akiya, Tokyo (JP); Satoshi Murasaki, Numazu (JP); Kazuhiko Shinoda, Abiko (JP); Shusuke Katori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/013,824

(22) Filed: Jun. 20, 2018

(65) Prior Publication Data

US 2019/0004458 A1 Jan. 3, 2019

(30) Foreign Application Priority Data

Jun. 30, 2017 (JP) ................................ 2017-128953

(51) Int. Cl.
*G03G 15/20* (2006.01)
*H02H 5/04* (2006.01)

(52) U.S. Cl.
CPC ......... *G03G 15/2039* (2013.01); *H02H 5/042* (2013.01); *H02H 5/047* (2013.01)

(58) Field of Classification Search
CPC .......... G03G 15/2017; G03G 15/2039; G03G 15/2053; G03G 21/1652
USPC ....................................... 399/33, 69, 90, 329
See application file for complete search history.

(56) References Cited

U.S. PATENT DOCUMENTS 9,037,057 B2 * 5/2015 Suzuki et al. ..... G03G 15/2053
399/329

FOREIGN PATENT DOCUMENTS

| JP | 2011118246 A | 6/2011 |
| JP | 2012252061 A | 12/2012 |
| JP | 2016151757 A | 8/2016 |

* cited by examiner

*Primary Examiner* — William J Royer
(74) *Attorney, Agent, or Firm* — Canon U.S.A., Inc. IP Division

(57) ABSTRACT

The disclosure provides a compact fixing device with reduced cost of wiring including electrical cables. In the fixing device, first and second wire guide members that seal a part of wires electrically connected to terminals of a temperature detection element and a part of wires electrically connected to terminals of a safety element are disposed in the internal space of a fixing film.

12 Claims, 23 Drawing Sheets

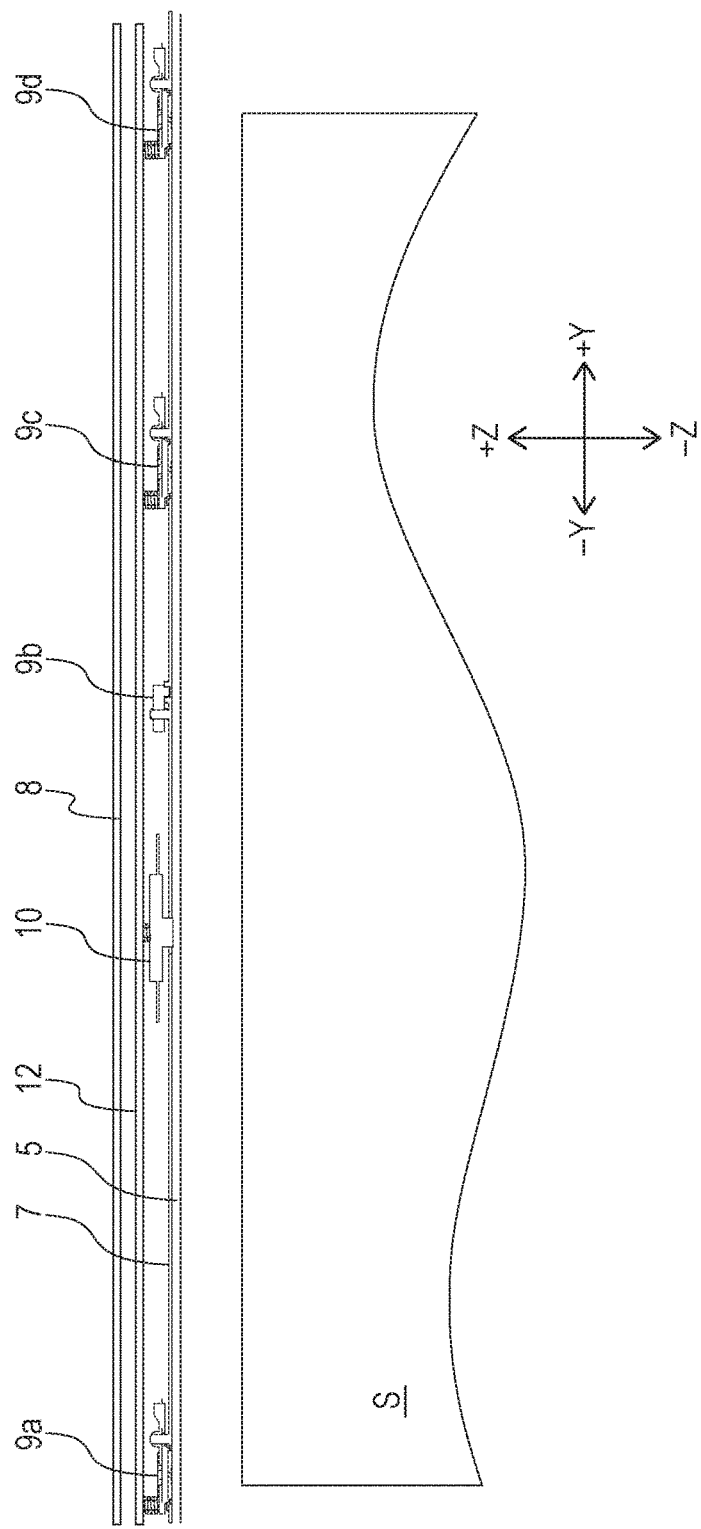

COMPACT FIXING DEVICE WITH REDUCED COST OF WIRING INCLUDING ELECTRICAL CABLES

BACKGROUND OF THE INVENTION

Field of the Invention

The disclosure relates to a fixing device that is mounted in an image forming apparatus such as a copying machine or a printer and that fixes an unfixed image formed on a recording material to the recording material.

Description of the Related Art

As a fixing device mounted in an electro photographic copying machine or printer, a fixing device of a film heating type is known. The fixing device of the film heating type includes a tubular film, a heater that is provided in the internal space of the film and that is in contact with the inner surface of the film, and a pressure roller that forms a fixing nip portion together with the heater with the film there between. The heater is held by a resin heater holder provided in the internal space of the film. The heater holder is reinforced by a metal reinforcing member (stay) provided in the internal space of the film.

A through hole is provided in a part of a heater holding seat surface of the heater holder. A temperature detection element (sensor or the like) that detects the temperature of the heater is disposed in the space between the heater holder and the reinforcing member. The temperature detection element is inserted into the through hole of the heater holder. The heater is controlled according to the detected temperature of the temperature detection element. In the space between the heater holder and the reinforcing member, a safety element (thermal switch, temperature fuse, or the like) for interrupting power supply to the heater in the event of an abnormality is also disposed. The safety element is also inserted into another through hole provided in the heater holder.

The sensor and a CPU (control unit) of the device are connected by an electrical cable. The CPU detects the temperature based on the voltage corresponding to the resistance value of the sensor and controls the heater according to the detected temperature.

The temperature detection element and the safety element are disposed so as to be in contact with the heater or in the vicinity of the heater. Therefore, a wire insulation covering a stripped wire of an electrical cable connected to the temperature detection element or the safety element is required to have heat resistance.

Japanese Patent Laid-Open No. 2011-118246 discloses that, by providing a heater holder with protrusions that support an electrical cable, the contact area between the electrical cable and the heater holder is reduced, and heat transfer from the heater to the electrical cable is suppressed.

As a signal line connected to a terminal of the temperature detection element and a power supply line connected to a terminal of the safety element, electrical cables that have a wire insulation as shown in Japanese Patent Laid-Open No. 2011-118246 is used. Since the electrical cables are disposed in the internal space of the film, the electrical cables are required to have not only insulation property but also heat resistance. When the control target temperature of the heater becomes higher with an increase in print speed, it is necessary to use electrical cables having better heat resistance and insulation property.

However, electrical cables that meet these requirements are expensive. In addition, electrical cables that satisfy the heat resistance and the insulation property have a thick wire insulation. Therefore, the space occupied by the electrical cables in the internal space of the film becomes large, which hinders downsizing of the fixing device.

SUMMARY OF THE INVENTION

The disclosure provides a compact fixing device with reduced cost of wiring including electrical cables.

In an aspect of the disclosure, a fixing device includes a tubular fixing film, a heater in contact with an inner surface of the fixing film, a temperature detection element that detects the temperature of the heater, and a safety element that, when the temperature of the heater rises to an abnormal degree, operates by the heat and interrupts power supply to the heater. An unfixed toner image formed on a recording material is fixed to the recording material by the heat of the heater. First and second wire guide members that seal a part of wires electrically connected to terminals of the temperature detection element and a part of wires electrically connected to terminals of the safety element are disposed in an internal space of the fixing film.

Further features and aspects of the disclosure will become apparent from the following description of numerous example embodiments with reference to the attached drawings.

BRIEF DESCRIPTION OF THE DRAWINGS

FIG. 3 is a cross-sectional view of an example heating unit.

DESCRIPTION OF THE EMBODIMENTS

Example Embodiment 1
Overall Example Configuration

Hereinafter, an example fixing device 1 of this embodiment will be described. The fixing device 1 is mounted in an image forming apparatus such as an electro photographic printer. Since the electro photographic recording technique is a well-known technique, its explanation is omitted.

Figure 1:
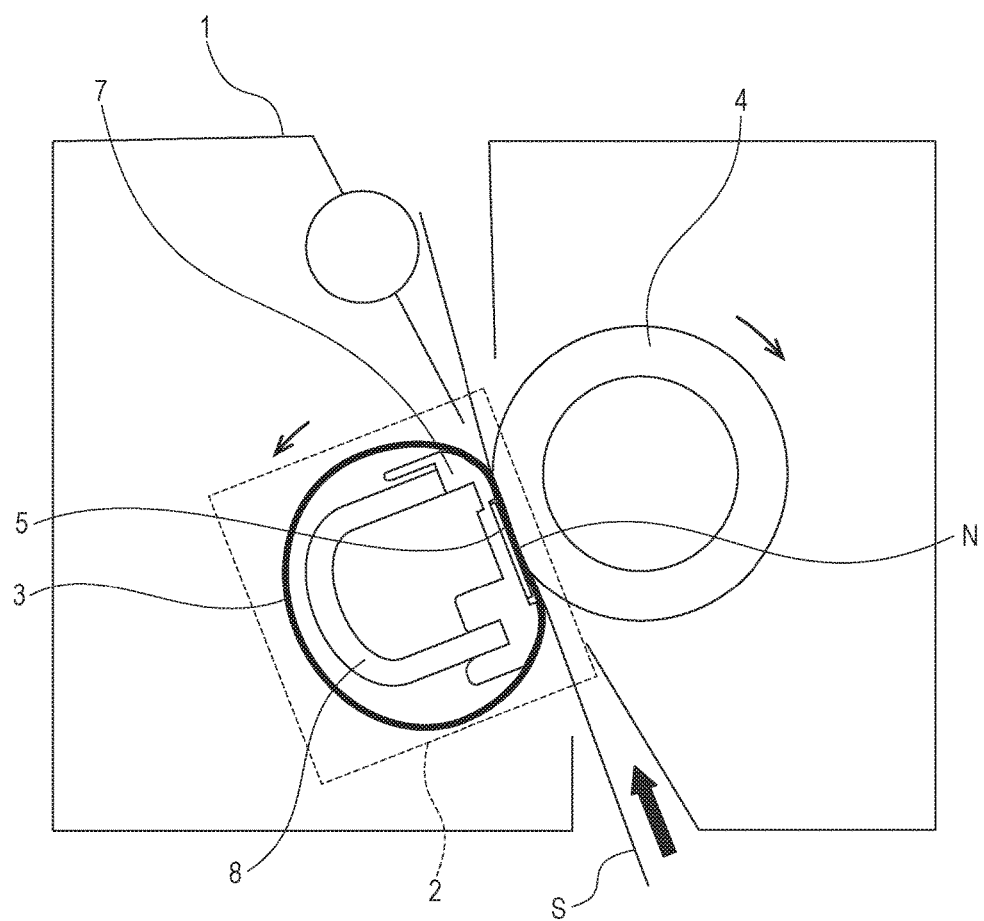
FIG. 1 is a cross-sectional view of an example fixing device.

The overall example configuration of the fixing device 1 will be described with reference to FIGS. 1 to 7. FIG. 1 is a cross-sectional view of the fixing device 1. The fixing device 1 has a heating unit 2 and a pressure roller 4 that forms a fixing nip portion N together with the heating unit 2. The heating unit 2 has a tubular fixing film 3. In the internal space of the fixing film 3, a heater 5 that is in contact with the inner surface of the fixing film 3, a heater holder 7 that holds the heater 5, and a metal stay (frame member) 8 that reinforces the heating unit 2 are provided. A sheet (recording material) S on which an unfixed toner image is formed is nipped and conveyed in the fixing nip portion N. When the sheet S passes through the fixing nip portion N, the toner image receives the heat from the heater 5 and the pressure applied to the fixing nip portion N. As a result, the toner image is fixed to the sheet S.

Figure 2:
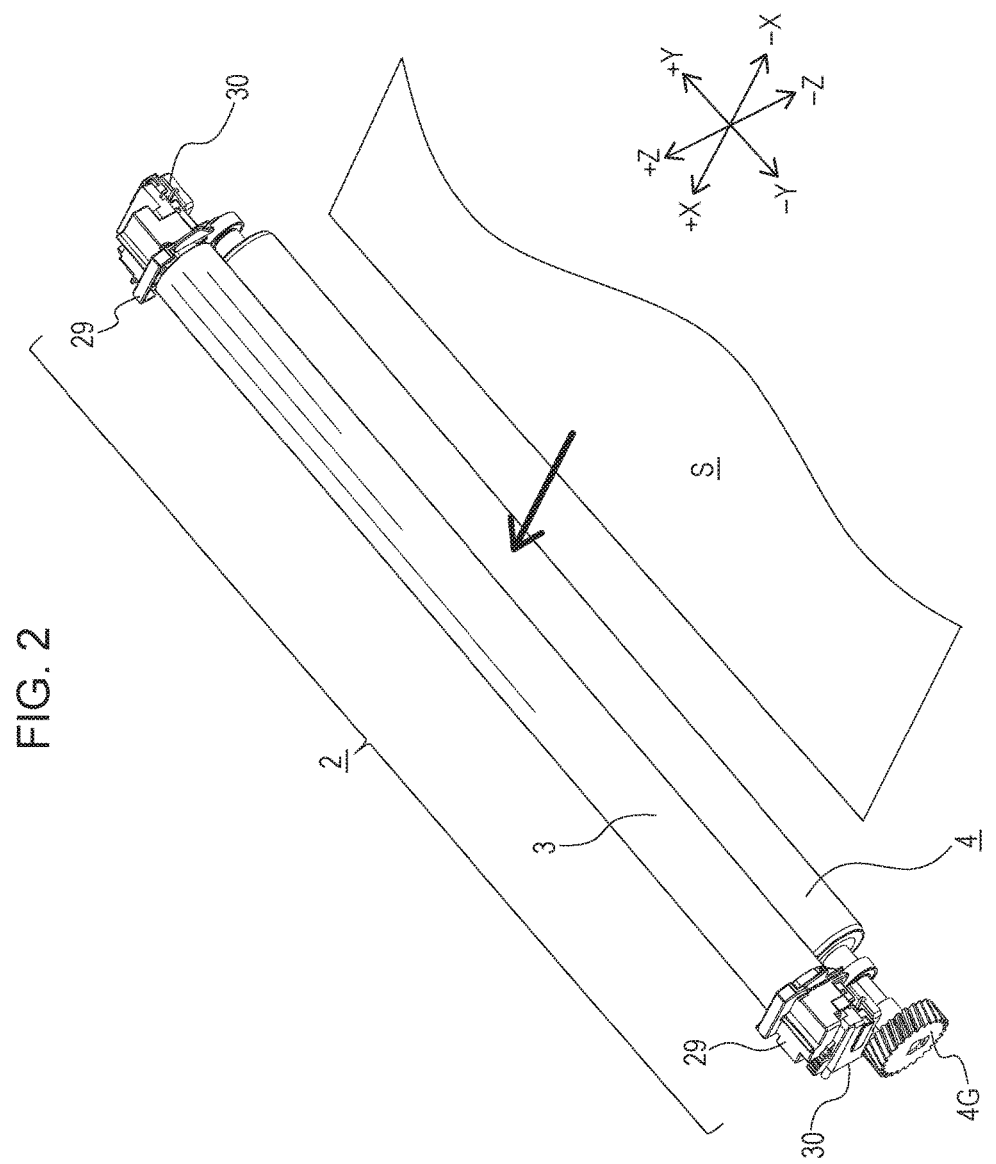
FIG. 2 is a perspective view of the fixing device.

FIG. 2 is a perspective view of the heating unit 2 and the pressure roller 4. The pressure roller 4 rotates by receiving the motive power of a driving source (not shown) with a gear 4G. The fixing film 3 in pressure contact with the pressure roller 4 rotates following the rotation of the pressure roller 4. Reference numeral 29 denotes flanges that restrict the fixing film 3 from shifting in the generatrix direction (±Y direction).

FIGS. 3 to 5B are cross-sectional views showing the internal space of the heating unit 2. In the internal space of the fixing film 3, four sensors 9a, 9b, 9c, and 9d and a thermal switch (safety element) 10 are disposed. Each of the four sensors 9a, 9b, 9c, and 9d has one thermistor (temperature detection element) 9at, 9bt, 9ct, 9dt. Of the four thermistors 9at, 9bt, 9ct and 9dt, three thermistors 9at, 9ct and 9dt, and the thermal switch 10 are disposed in the space surrounded by the heater holder 7 and the stay 8. Four holes 17 are provided in a seat surface of the heater holder 7 on which the heater 5 is held. The three thermistors 9at, 9ct and 9dt and the thermal switch 10 are inserted one in each of the holes 17, and are each in contact with the heater 5. The three thermistors 9at, 9ct, and 9dt are elements whose resistance values change according to the temperature of the heater 5. The thermal switch 10 is a switch that, when the temperature of the heater 5 rises to an abnormal degree, operates by the heat, and has a role of interrupting power supply to the heater 5.

FIGS. 3 to 5B are cross-sectional views showing the internal space of the heating unit 2. In the internal space of the fixing film 3, four sensors 9a, 9b, 9c, and 9d and a thermal switch (safety element) 10 are disposed. Each of the four sensors 9a, 9b, 9c, and 9d has one thermistor (temperature detection element) 9at, 9bt, 9ct, 9dt. Of the four thermistors 9at, 9bt, 9ct and 9dt, three thermistors 9at, 9ct and 9dt, and the thermal switch 10 are disposed in the space surrounded by the heater holder 7 and the stay 8. Four holes 17 are provided in a seat surface of the heater holder 7 on which the heater 5 is held. The three thermistors 9at, 9ct and 9dt and the thermal switch 10 are inserted one in each of the holes 17, and are each in contact with the heater 5. The three thermistors 9at, 9ct, and 9dt are elements whose resistance values change according to the temperature of the heater 5. The thermal switch 10 is a switch that, when the temperature of the heater 5 rises to an abnormal degree, operates by the heat, and has a role of interrupting power supply to the heater 5. The heater 5 is supplied with power via two power supply connectors 30 to generate heat.

Figure 4A:
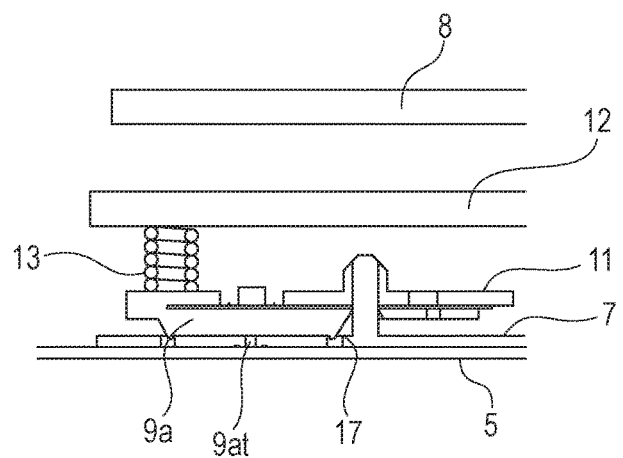
FIGS. 4A to 4C are enlarged cross-sectional views of example sensors and an example thermal switch.
Figure 4B:
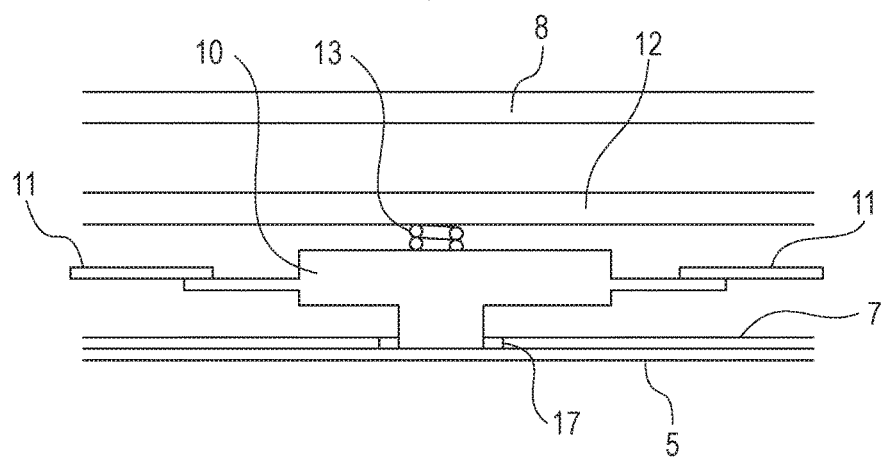
Figure 4C:
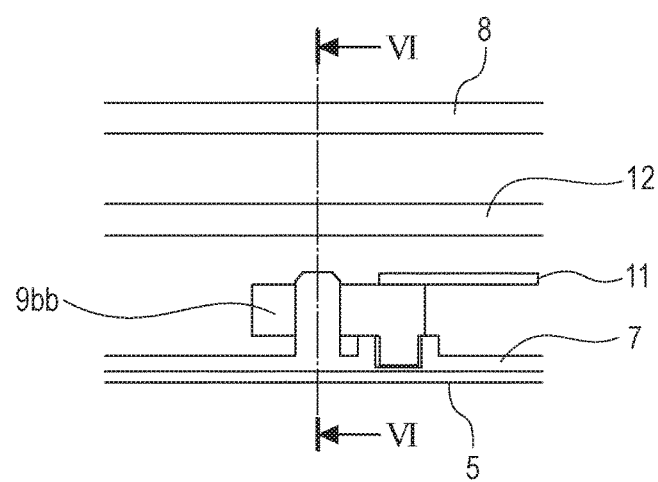
Figure 5A:
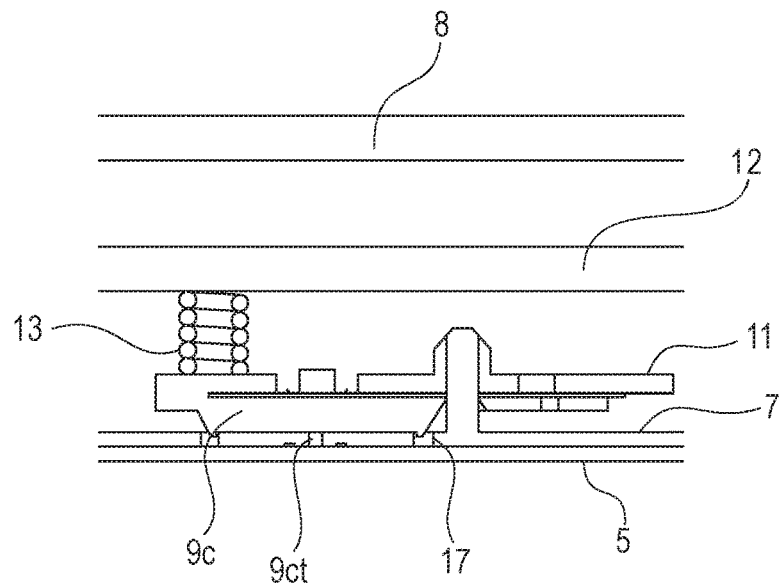
FIGS. 5A and 5B are enlarged cross-sectional views of the sensors.
Figure 5B:
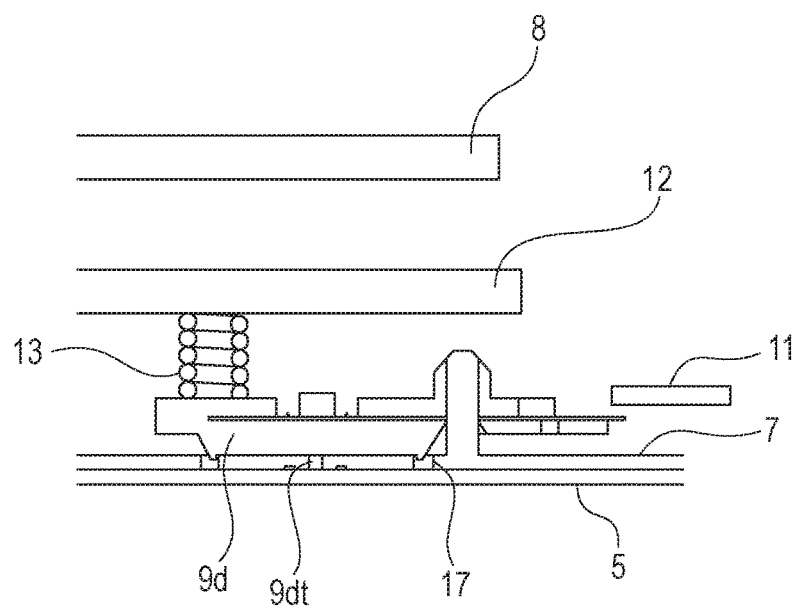
Figure 6:
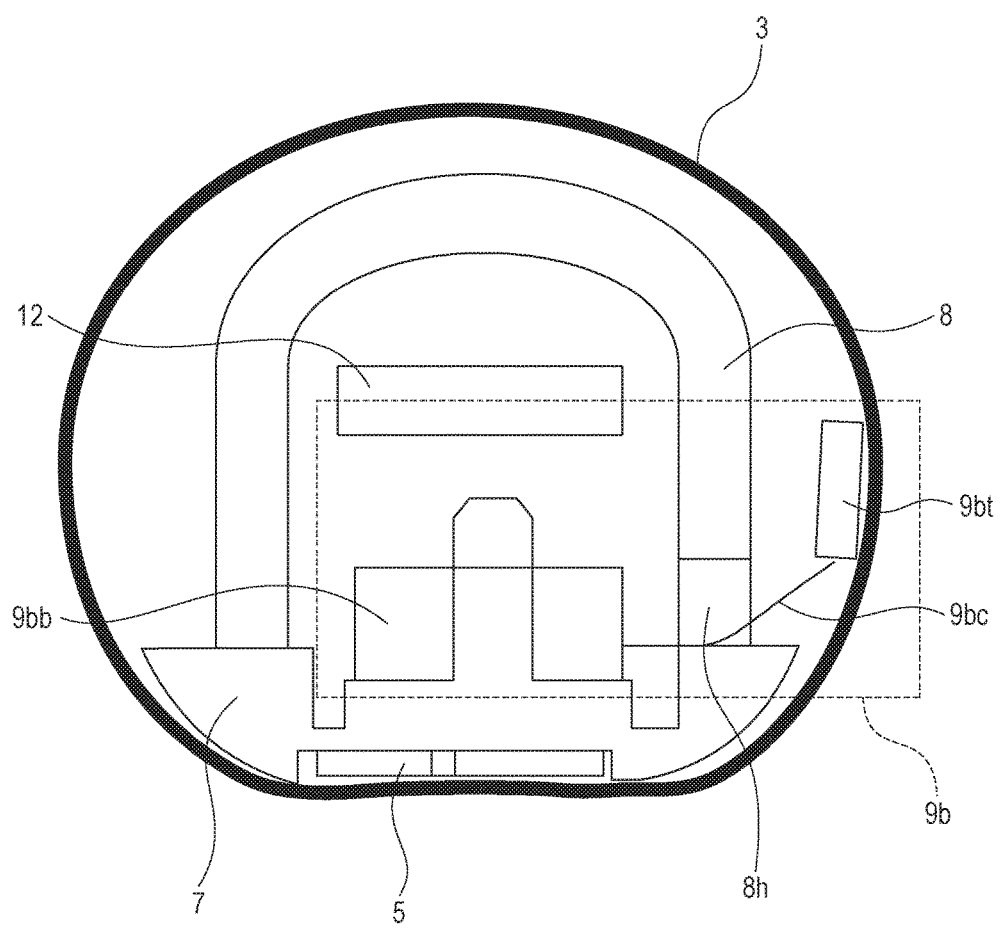
FIG. 6 is a cross-sectional view of the heating unit taken along line VI-VI of FIG. 4C.

As shown in FIG. 6, which is a cross-sectional view taken along line VI-VI of FIG. 4C, the sensor 9b has a connecting portion 9bb that is fixed on the heater holder 7 and to which a wire 11 described later is connected, and a thermistor 9bt in contact with the inner surface of the fixing film 3. The thermistor 9bt is held by a leaf spring 9bc, and the leaf spring 9bc is held by the connecting portion 9bb through a through hole 8h formed in the stay 8.

The outputs of the thermistors 9at, 9bt, 9ct, and 9dt are input to the control unit (CPU) through wires 11 to be described later. The control unit drives the heater driving unit (triac) according to the outputs of the thermistors 9at, 9bt, 9ct, and 9dt.

The thermal switch 10 is connected between the relay driving unit of the power supply unit and the relay. When the thermal switch 10 is turned OFF by heat caused by abnormal temperature rise of the heater 5, the power supply to the relay is cut off, the relay is turned OFF, and the power supply to the heater 5 is stopped.

The thermistor 9bt of the sensor 9b detects the temperature of the inner surface of the fixing film 3 in the vicinity of the center in the generatrix direction (±Y direction) of the fixing film 3. The control unit controls power supply to the heater 5 (controls the heater driving unit) so that the temperature detected by the thermistor 9bt maintains the control target temperature. The sensors 9a and 9d detect the temperature of the end portions of the heater 5 in the longitudinal direction (±Y direction) of the heater 5. The sensor 9c is disposed about midway between the sensors 9b and 9d, and detects the temperature of the heater 5. The sensors 9a, 9c, and 9d are sensors that monitor the temperature of the non-sheet passing area of the heater when fixing small size paper. The thermal switch 10 is provided near the center of the heater 5 in the longitudinal direction of the heater 5.

The fixing device 1 of this embodiment is mounted in a center-reference printer which conveys a recording material such that the center in the width direction of the recording material to be passed coincides with the central portion in the longitudinal direction of the heater 5. Therefore, regardless of the size of the recording material to be passed, the position where the sensor 9b is disposed and the position where the thermal switch 10 is disposed are within the passing region of the recording material. In the fixing device 1 of this embodiment, the sensor 9b for temperature control is of a type that detects the temperature of the fixing film 3, but may be of a type that detects the temperature of the heater 5. In addition, the type, number, and location of the temperature detection elements and the safety element are not limited to those of this embodiment. Further, the temperature detection elements and the safety element may be directly bonded to the heater 5. Further, a thermal fuse may be used instead of the thermal switch 10.

Example Circuit Configuration

Figure 7:
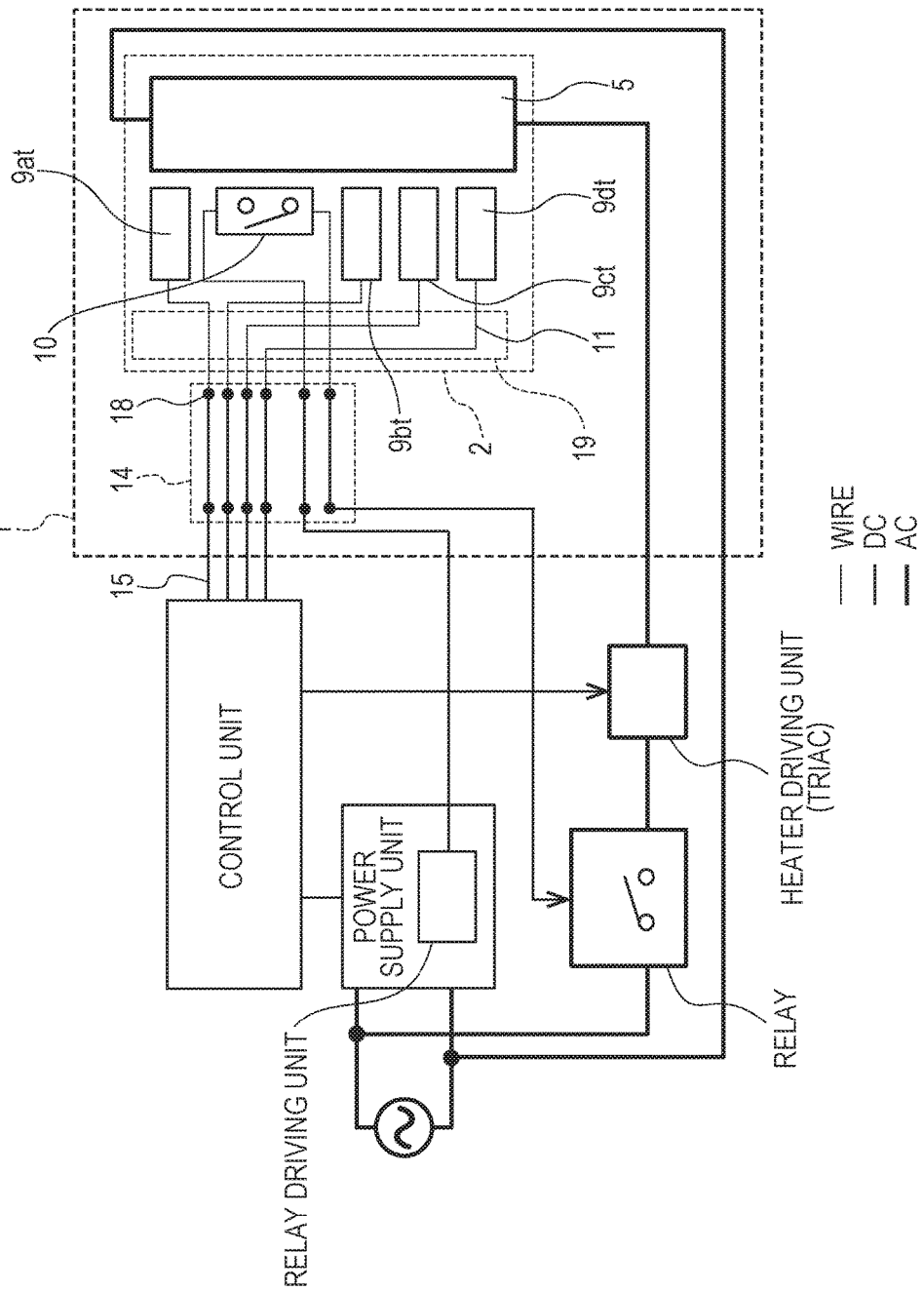
FIG. 7 is an example circuit diagram of the heating unit.

Next, the circuit of the heating unit 2 will be described with reference to FIG. 7. Each of the thermistors 9at, 9bt, 9ct, and 9dt is electrically connected to a control unit provided outside the fixing device 1 (within the printer) through a conductive wire 11, a relay conductive member 14, and an external conductive member 15. Thus, a temperature detection circuit is configured. The relay driving unit in the low-voltage power supply unit is electrically connected to the relay through an external conductive member 15, a relay conductive member 14, a wire 11, the thermal switch 10, a wire 11, a relay conductive member 14, and an external conductive member 15. These constitute a heater protection circuit. In the device of this embodiment, both the temperature detection circuit and the heater protection circuit are DC circuits driven by DC voltage.

The wires 11 are elongated members, and are connected to the sensors 9a, 9b, 9c, and 9d and the thermal switch 10 so that the longitudinal direction thereof is along the longitudinal direction of the heater 5. The heater holder 7 is in a high temperature state due to the heat transferred from the heater 5, and the sensors 9, the thermal switch 10, and the wires 11 are also in a high temperature state. Also, in order to cause the electric parts to operate safely, it is necessary to insulate the DC circuits including the sensors 9 and the thermal switch 10. In the case of having four sensors 9 and a thermal switch 10 as in the present configuration, ten DC circuit wires 11 need to be disposed so as not to be in contact with each other. Further, since the metal frame member 8 is provided in the internal space of the fixing film 3, it is necessary to secure a distance necessary for insulation between the wires 11 and the frame member 8.

In the fixing device of this embodiment, stripped wires (tin plated copper wires with a wire diameter of 0.45 mm) without a wire insulation are used as the wires 11, and a part of the wires 11 is sealed in wire guide members 19 (19a, 19b) made of a heat-resistant resin. The material of the wire guide members 19 is LCP (liquid crystal polymer). A part of the wire guide members 19, and joint portions 18 between the wires 11 and the relay conductive members 14 protrude outward from the internal space of the fixing film 3 in the generatrix direction of the fixing film. A detailed description thereof will be given below.

Example Wire Guide Members

Figure 8A:
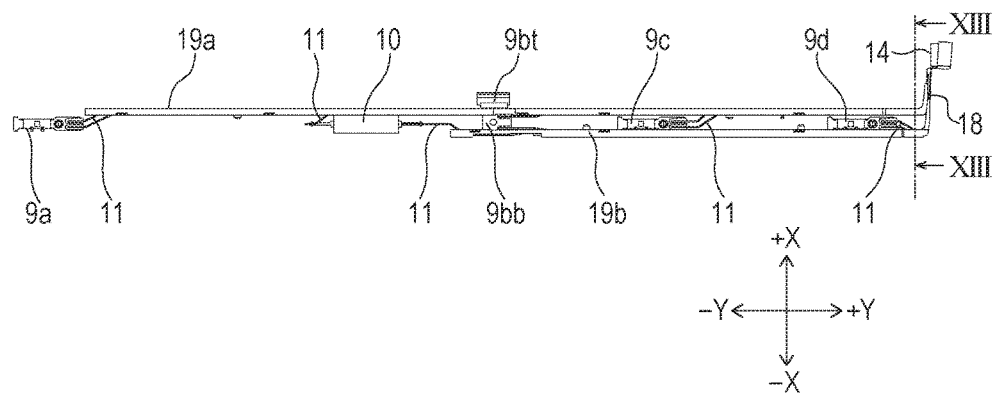
FIGS. 8A and 8B are example configuration diagrams of a sensor unit.
Figure 8B:
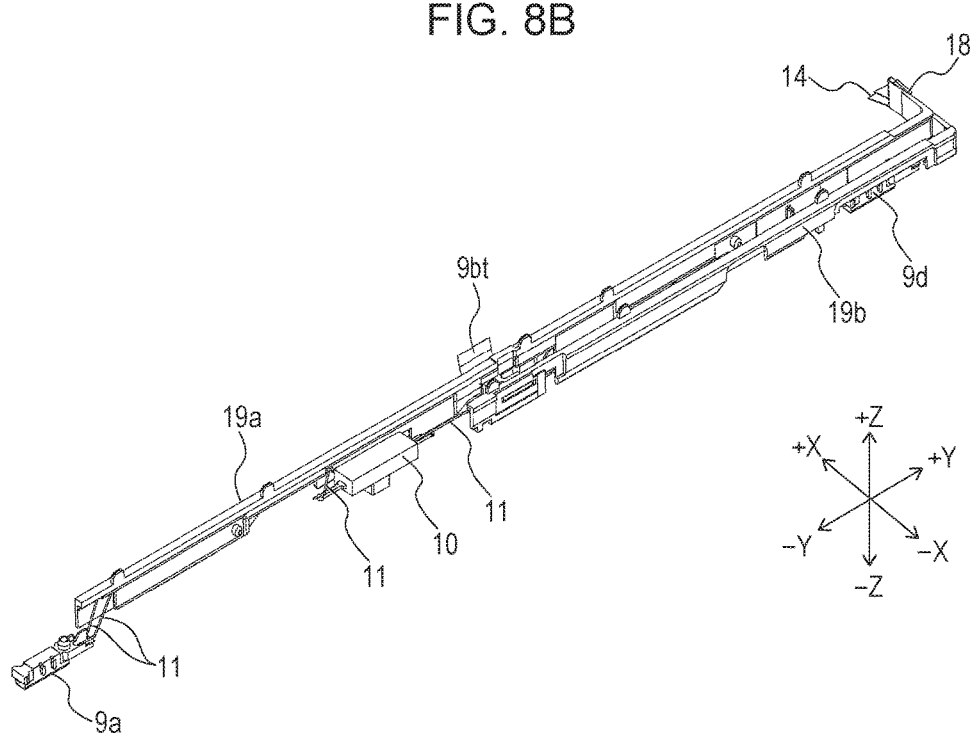

The wire guide members 19 will be described with reference to FIGS. 8A and 8B. FIG. 8A is a top view of the wire guide members 19 holding the four sensors and the thermal switch, and FIG. 8B is a perspective view thereof. In the device of this embodiment, since four sensors 9a, 9b, 9c, 9d and one thermal switch 10 are mounted, ten wires 11 used as electrical cables of the DC circuits are required. However, if all of the ten wires 11 are electrical cables having a wire insulation with high heat resistance, the cost increases. Furthermore, the space occupied by the electrical cables in the internal space of the frame member 8 becomes large, which leads to an increase in size of the device.

On the other hand, there is a method of sealing ten wires (stripped wires) in an insulating wire guide member such that they are not in contact with each other. However, in the case of a configuration in which ten wires are sealed in one wire guide member such that they are not in contact with each other, it is necessary to widen the width of the wire guide member, and it is difficult to accommodate the wire guide member in the internal space of the frame member 8.

In this embodiment, therefore, two wire guide members are provided, six wires 11 are disposed in the wire guide member (first wire guide member) 19a, and four wires 11 are disposed in the wire guide member (second wire guide member) 19b. The two wire guide members 19a and 19b are disposed so as to sandwich the sensors 9a, 9b, 9c, and 9d and the thermal switch 10. A part of each wire 11 that is located between each sensor and the thermal switch 10 and the wire guide members is not sealed in either of the wire guide members 19a and 19b and is exposed.

Figure 9A:
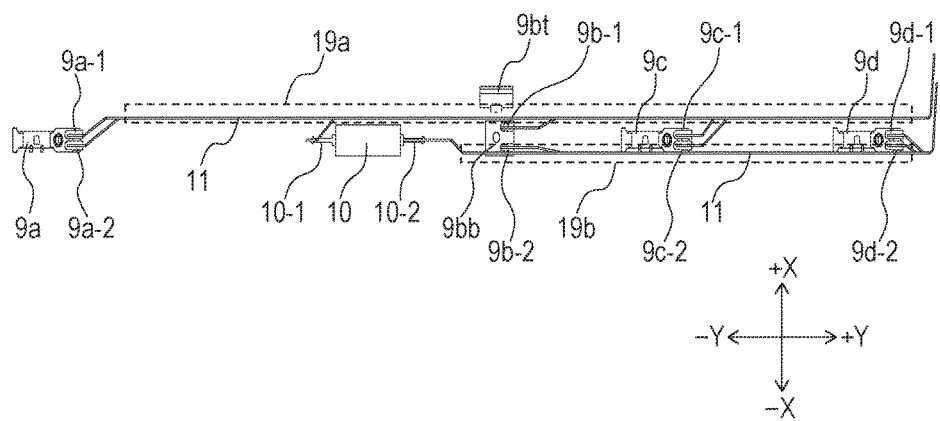
FIGS. 9A and 9B are example configuration diagrams of the sensor unit.
Figure 9B:
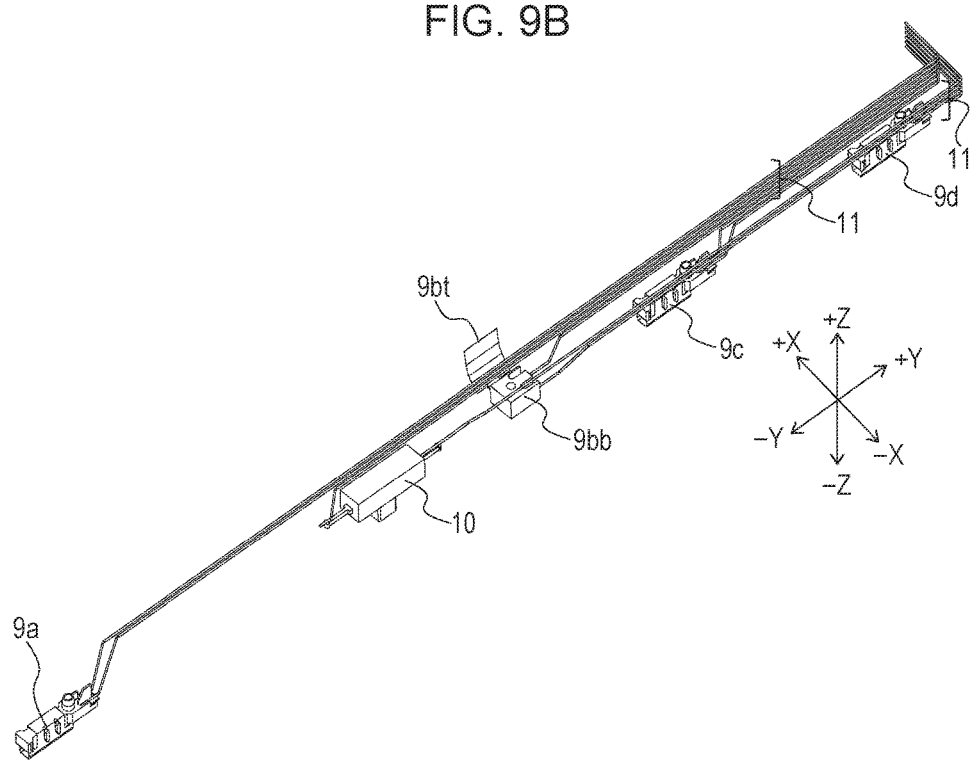

FIGS. 9A and 9B are views showing the sensors 9a, 9b, 9c, and 9d, the thermal switch 10, and the wires 11 in a state where the wire guide members 19a and 19b are removed from FIGS. 8A and 8B. The wire guide members 19a and 19b are indicated by broken lines. FIG. 9A is a top view, and FIG. 9B is a perspective view. Terminals 9a-1 and 9a-2 of the sensor 9a, a terminal 10-1 of the thermal switch 10, a terminal 9b-1 of the sensor 9b, terminals 9c-1 and 9c-2 of the sensor 9c are electrically connected to the wires 11 in the wire guide member 19a. A terminal 10-2 of the thermal switch 10, a terminal 9b-2 of the sensor 9b, and terminals 9d-1 and 9d-2 of the sensor 9d are electrically connected to the wires 11 in the wire guide member 19b. As described above, at least one element 9b, 10 of the sensors 9a to 9d and the thermal switch 10 has two terminals that are connected to a wire sealed in the first wire guide member 19a and a wire sealed in the second wire guide member 19b. At least one element 9a, 9c, 9d of the sensors 9a to 9d and the thermal switch has two terminals that are both connected only to wires sealed in one of the first and second wire guide members.

Figure 10A:
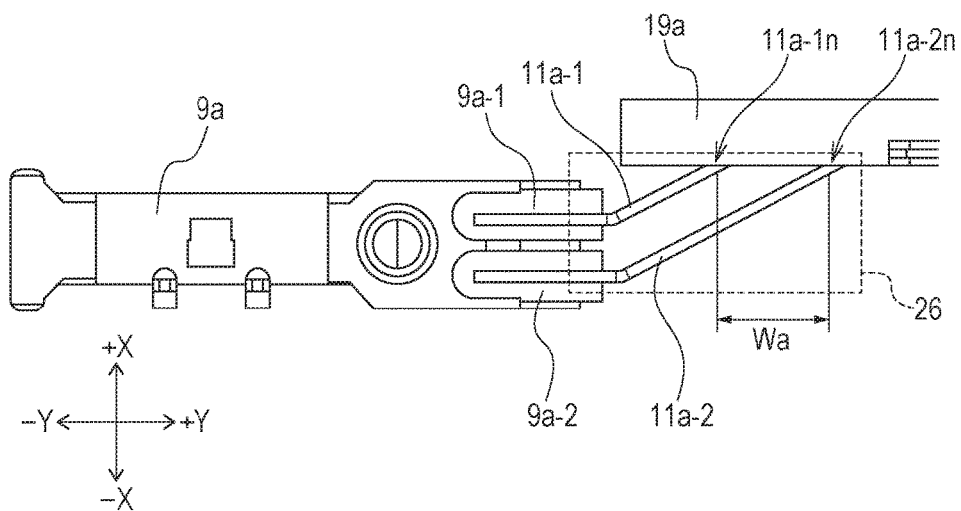
FIGS. 10A and 10B are enlarged views of the vicinity of the sensor.
Figure 10B:
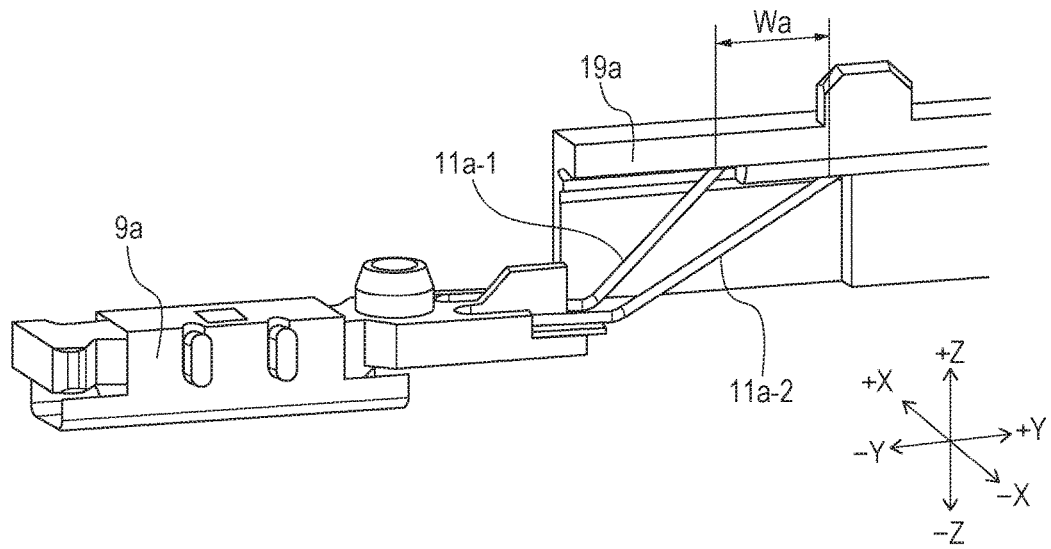

FIGS. 10A and 10B are detailed views of a joint portion between the sensor 9a and the wire guide member 19a. As shown in FIGS. 10A and 10B, the sensor 9a has two terminals 9a-1 and 9a-2. Two wires 11a-1 and 11a-2 connected to these terminals are both held by the wire guide member 19a. The position of the base of the exposed part of the wire 11a-1 connected to the terminal 9a-1 nearer to the wire guide member 19a in the ±X direction is 11a-1n. The position of the base of the exposed part of the wire 11a-2 connected to the terminal 9a-2 farther from the wire guide member 19a is 11a-2n. The two wires 11a-1 and 11a-2 are plastically deformed in a bending portion 26 so that the position 11a-2n is farther from the sensor 9a than the position 11a-1n. Then, the terminals and the wires are joined in a state of being plastically deformed. This prevents short-circuit between the wire 11a-1 and the wire 11a-2 joined to the terminals 9a-1 and 9a-2. The distance between the position 11a-2n and the positions 11a-1n is Wa. The terminals and the wires are joined by welding. The bases of the exposed parts of two wires connected to the sensor 9c are also away from each other by the distance Wa on the wire guide member 19a. The bases of the exposed parts of two wires connected to the sensor 9d are also away from each other by the distance Wa on the wire guide member 19b.

Figure 11A:
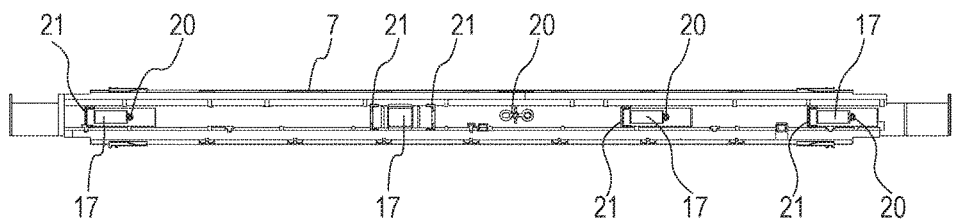
FIGS. 11A to 11C are views showing the example heating unit.
Figure 11B:
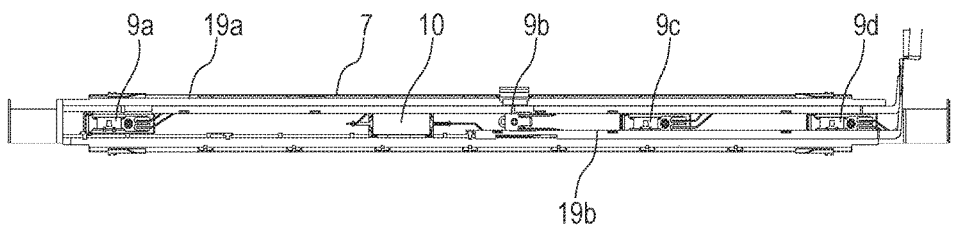
Figure 11C:
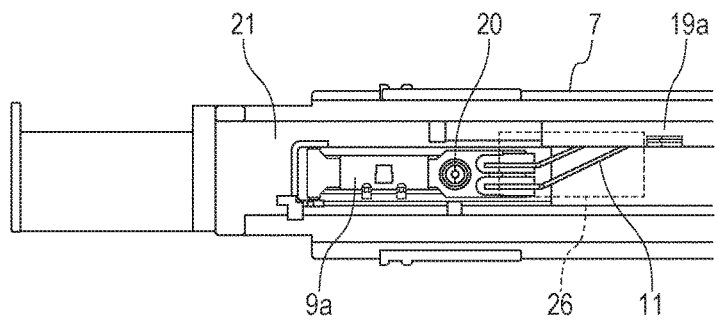

FIGS. 11A to 11C are top views showing the heater holder 7, and the wire guide members 19 disposed on the heater holder 7. FIG. 11A is a view only of the heater holder 7, FIG. 11B is a view showing the heater holder 7 on which the wire guide members 19a and 19b are disposed, and FIG. 11C is a detailed view of the sensor 9a portion. The sensors 9 and the thermal switch 10 are positioned in the ±Y direction and the ±X direction by positioning bosses 20 and positioning ribs 21 so that the sensors 9 and the thermal switch 10 can freely move on the heater holder 7 in a direction perpendicular to the heater 5. Therefore, in the case where the bending portion 26 as in this embodiment is not provided, when the sensors 9 are pressed against the heater 5 by the pressing springs 13, there is a possibility that, due to a variation in the length of the wires 11, the wires 11 are stretched or strained. In this case, sufficient pressing force cannot be obtained. On the other hand, if the wires 11 coming out of the wire guide members 19 are provided with the bending portion 26, the sensors 9 and the thermal switch 10 can be kept stably pressed against the heater 5. At this time, as the wire diameter of the wires 11 increases, the second moment of area increases, so that the rigidity increases and the influence on the urging force of the pressing springs 13 increases. In addition, the wire guide members 19 in which the wires 11 are disposed become large. On the other hand, if the wires 11 are too thin, the influence on the urging force of the pressing springs 13 can be small, but the wires 11 are weak and there is a possibility that the wires 11 are broken during joining, assembling, operation, or the like. For this reason, wires having an appropriate wire diameter can be used.

As described above, the two wires 11 connected to each of the sensors 9a, 9c, and 9d are held by one of the wire guide members 19a and 19b. On the other hand, the two wires connected to the sensor 9b and the two wires connected to the thermal switch 10 are held one by each of the wire guide members 19a and 19b. As described above, first and second wire guide members 19a and 19b that seal a part of wires electrically connected to the terminals of the temperature detection elements and a part of wires electrically connected to the terminals of the safety element are disposed in the internal space of the fixing film 3. With this configuration, it is possible to provide a compact fixing device with reduced cost of wiring including electrical cables. At least one of the first and second wire guide members has a length such that the ends thereof extend to the outside of the fixing film 3.

As shown in FIGS. 9A and 9B, the terminals 9b-1 and 10-1 are joined to wires 11 exposed from the wire guide member 19a, and the terminals 9b-2 and 10-2 are joined to wires 11 exposed from the wire guide member 19b. Since the wires connected to the two terminals of the thermal switch 10 are held one by each of the two wire guide members, when at least one of the two wire guide members breaks and the wire 11 connected to the thermal switch 10 breaks, the relay is always turned OFF. Therefore, abnormal heat generation of the heater 5 can be prevented, so that safety is improved.

Figure 12A:
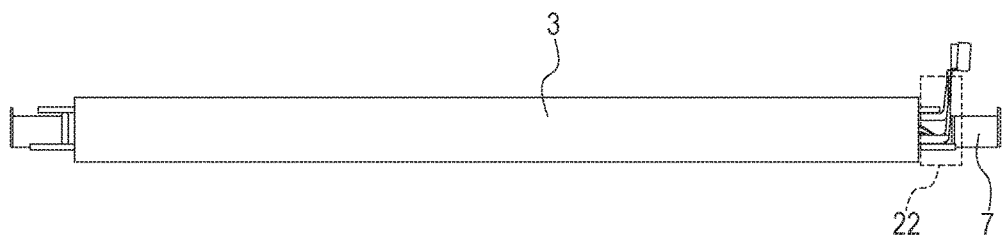
FIGS. 12A and 12B are views showing the example heating unit.
Figure 12B:
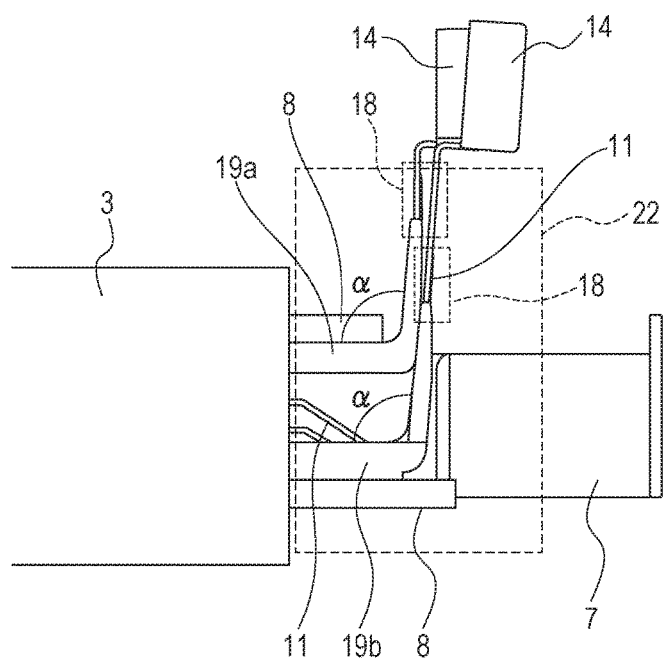

Next, with reference to FIGS. 12A and 12B, a method for connecting the wires 11 of the wire guide members 19 to a circuit provided outside the fixing film 3 will be described. FIG. 12A is a view showing a state in which the fixing film 3 is attached to the heater holder 7, and FIG. 12B is a detailed view of the joint portions 18 from the wire guide members 19 to the relay conductive members 14. Both of the ends 22 of the wire guide members 19a and 19b are bent at an angle α outside the fixing film 3. It is best to set this angle α to 90 degrees in order to miniaturize the heating unit 2. However, in this embodiment, the angle α was set to 95° in order to take advantage of the merit that the releasability at the time of molding the wire guide members 19 which are resin members is good. The angle α is preferably in the range of 80° to 120°. From the ends 22 bent at the angle α, the wires 11 are exposed, and are joined to the relay conductive members 14 for connecting to a control unit (not shown) at the joint portions 18. As described above, by providing the joint portions 18 between the relay conductive members 14 and the wires 11 outside the fixing film 3, it is possible to use inexpensive relay conductive members 14 which do not have a high withstanding temperature limit. In this embodiment, FFCs (flexible flat cables) are used as the relay conductive members 14.

Figure 13A:
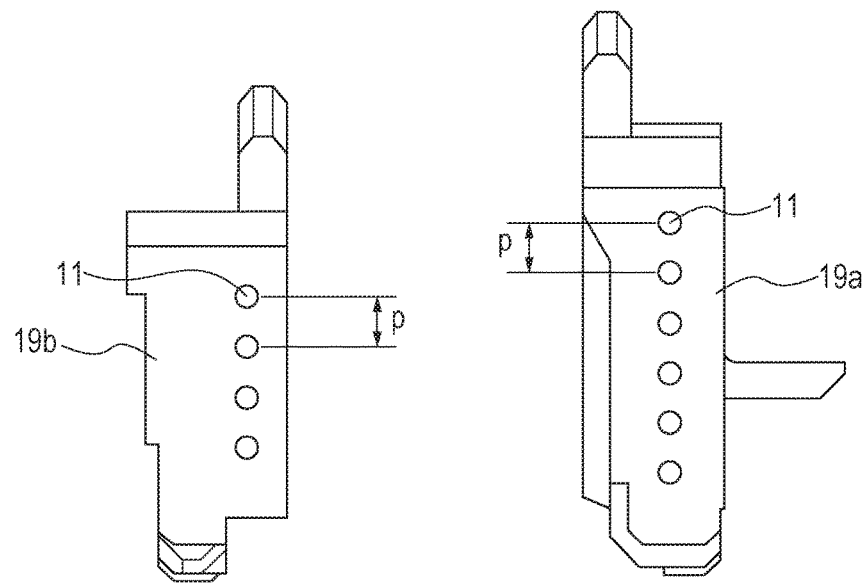
FIGS. 13A and 13B are cross-sectional views of example wire guide members.
Figure 13B:
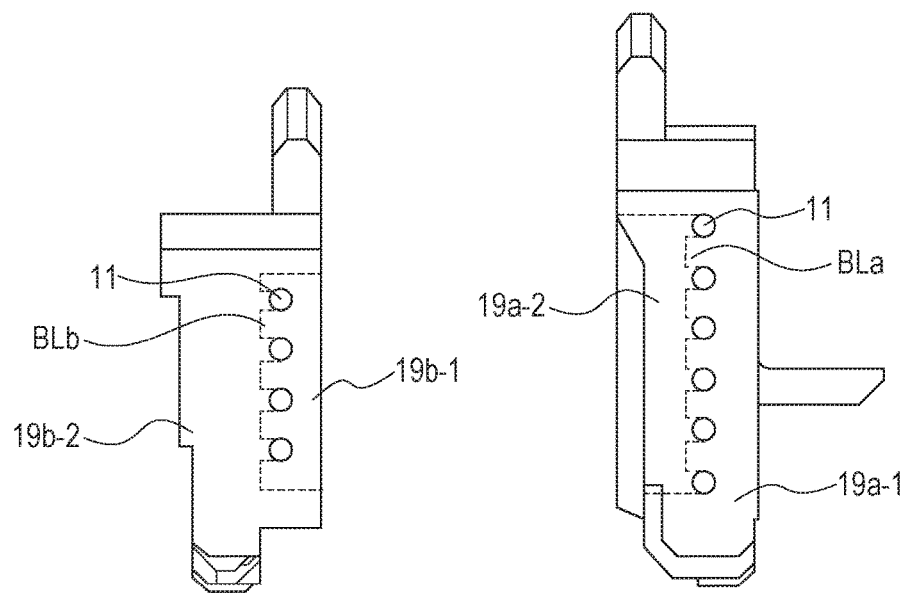

FIGS. 13A and 13B are cross-sectional views taken along line XIII-XIII of FIG. 8A. As shown in FIG. 13A, the wires 11 are disposed at a constant interval p (1 mm in this embodiment) in the wire guide members 19a and 19b, and the wires 11 are sealed in the resin so as not to come into contact with each other. In this embodiment, since FFCs are used as the relay conductive members 14, the wires 11 are disposed at a constant interval, but in the case of using stranded wires covered with a wire insulation as the relay conductive members 14, it is unnecessary to dispose the wires 11 at a constant interval.

Figure 15:
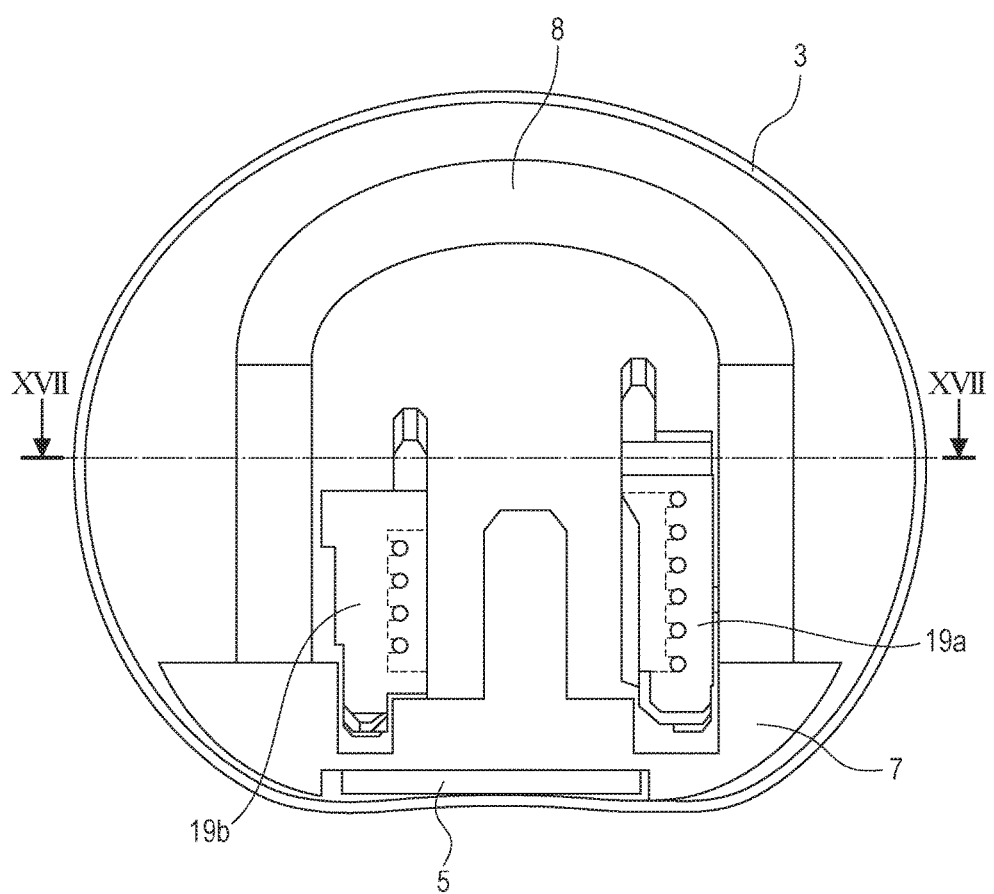
FIG. 15 is a cross-sectional view of the example heating unit.

FIG. 15 is a cross-sectional view of the heating unit at the cross-sectional position shown in FIG. 13A. All of the wires 11 shown in FIG. 15 are away from the frame member 8 by a creep age distance equal to or more than a predetermined distance to ensure insulation. In the case where the wires 11 are sealed in the wire guide members 19 made of resin as in this embodiment, the wires 11 may be deformed by the injection pressure of resin at the time of molding. If deformation occurs, it is conceivable that the wires contact each other in the resin of the wire guide members 19, so it is necessary to prevent this situation.

Therefore, the wire guide member 19a is configured by combining two resin portions 19a-1 and 19a-2 separated by the boundary surface BLa indicated by a broken line in FIG. 13B. The wires 11 are sandwiched between the two resin portions 19a-1 and 19a-2. Likewise, the wire guide member 19b is configured by combining two resin portions 19b-1 and 19b-2 separated by the boundary surface BLb, and the wires 11 are sandwiched between the two resin portions 19b-1 and 19b-2. The wire guide member 19a will be described below.

Figure 14A:
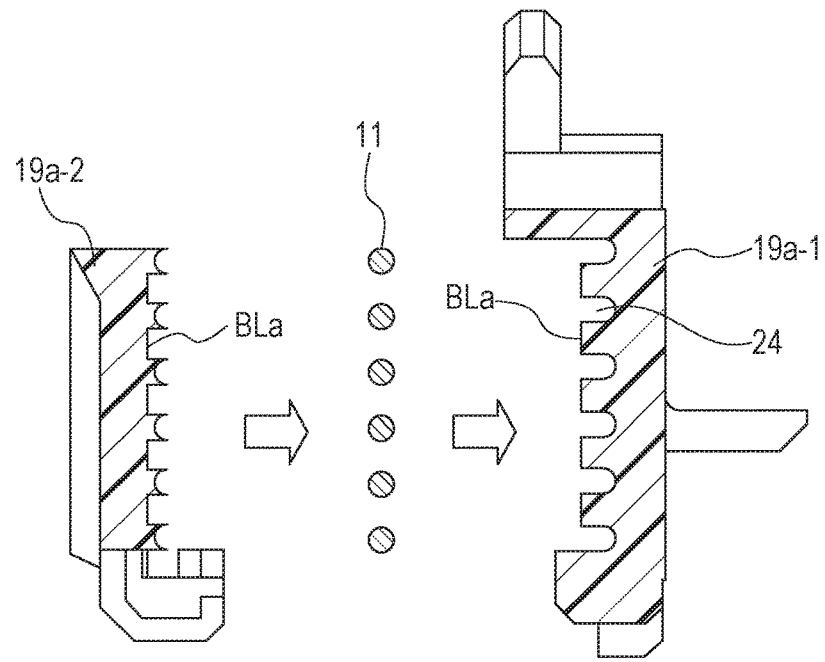
FIGS. 14A and 14B are views illustrating an example method for manufacturing the wire guide members.
Figure 14B:
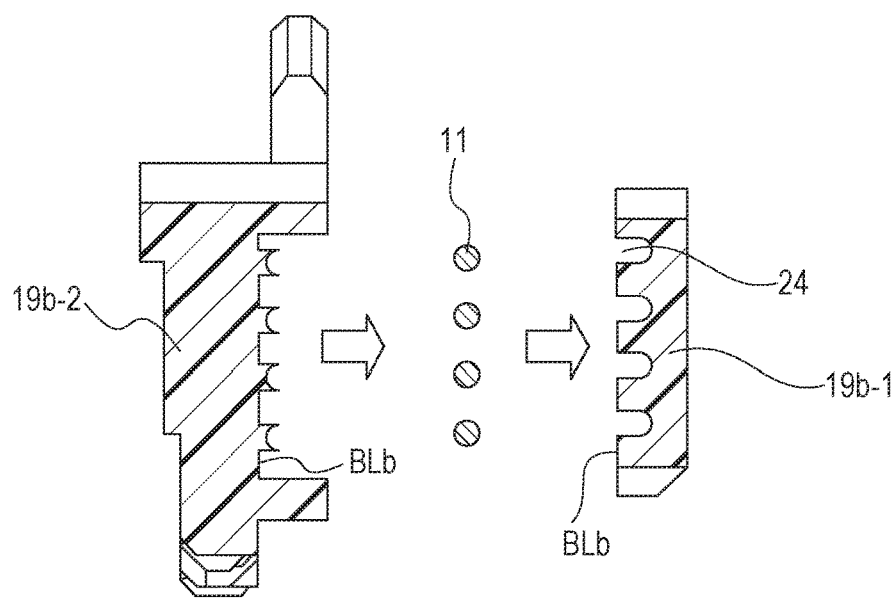

FIG. 14A is a detailed view showing the resin portion 19a-1, the wires 11, and the resin portion 19a-2 separately. First, the resin portion 19a-1 is molded by a molding machine. The resin portion 19a-1 molded by the molding machine is provided with grooves 24 so that the wires 11 can be disposed at a predetermined pitch. Next, the wires 11 are placed along the grooves 24 of the resin portion 19a-1, and put in the molding machine again. By molding the resin portion 19a-2 so as to be joined to the resin portion 19a-1 in which the wires 11 are disposed, the wire guide member 19a in which the wires 11 are sealed is completed. As shown in FIG. 14B, the wire guide member 19b is also molded by the same procedure.

When molding the resin portion 19a-2, the grooves 24 of the resin portion 19a-1 prevent the wires 11 from contacting each other due to the injection pressure of the resin. At this time, it is difficult to completely bring the resins into close contact with each other only by molding, and the boundary surface between the resin portions 19a-1 and 19a-2 indicated by the boundary surface BLa in FIG. 13B is not insulated. Therefore, it is necessary to separate the wires 11 included in the wire guide member 19a from the frame member 8 by such a distance that insulation can be kept.

Figure 16A:
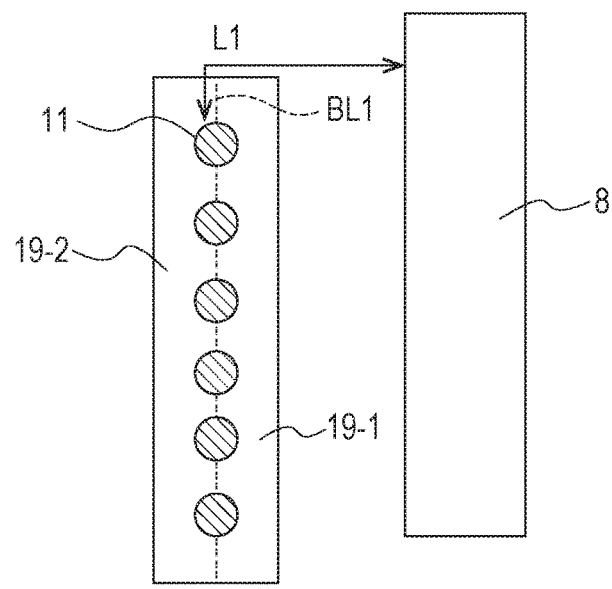
FIGS. 16A and 16B are views illustrating creep age distances.
Figure 16B:
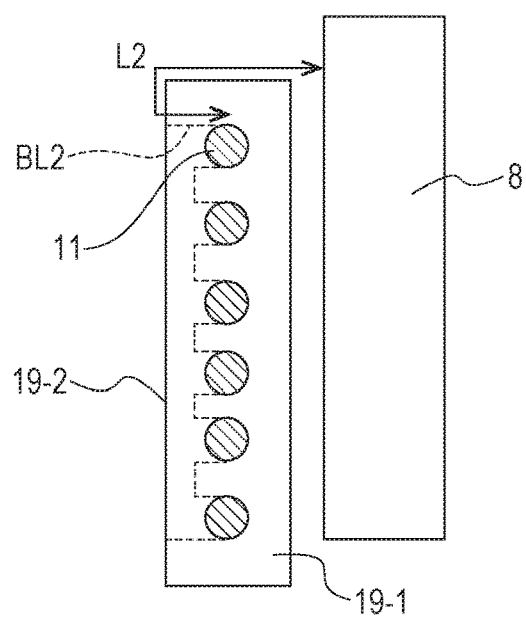

FIGS. 16A and 16B are model diagrams for explaining the relationship between a boundary surface BL1 of the wire guide member 19 and the distance to the frame member 8. FIG. 16A shows a case where the wire guide member 19 is linearly divided into a resin portion 19-1 and a resin portion 19-2, and the wires 11 are sandwiched there between. In this case, in order to secure the creep age distance L1 from the wires 11 to the frame member 8, it is necessary to distance the wire guide member 19 from the frame member 8. For this reason, the heating unit 2 becomes large and the fixing device 1 becomes large-sized.

FIG. 16B shows a case where, similarly to this embodiment, the boundary surface between the resin portion 19-1 and the resin portion 19-2 is formed in the shape indicated by the broken line BL2. With the configuration of FIG. 16B, the distance between the wire guide member 19 and the frame member 8 can be reduced while securing the creep age distance L2 (=L1).

Figure 17:
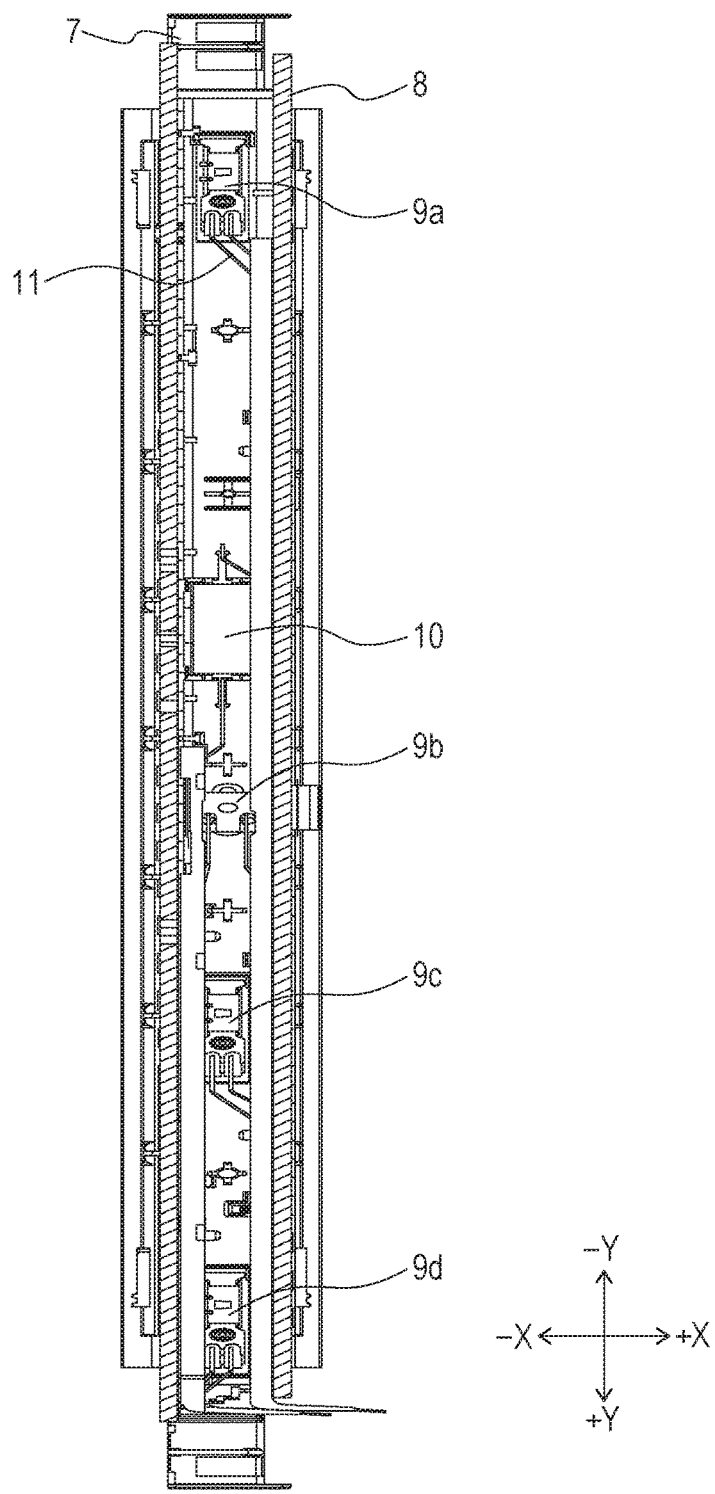
FIG. 17 is a cross-sectional view of the heating unit.
Figure 18:
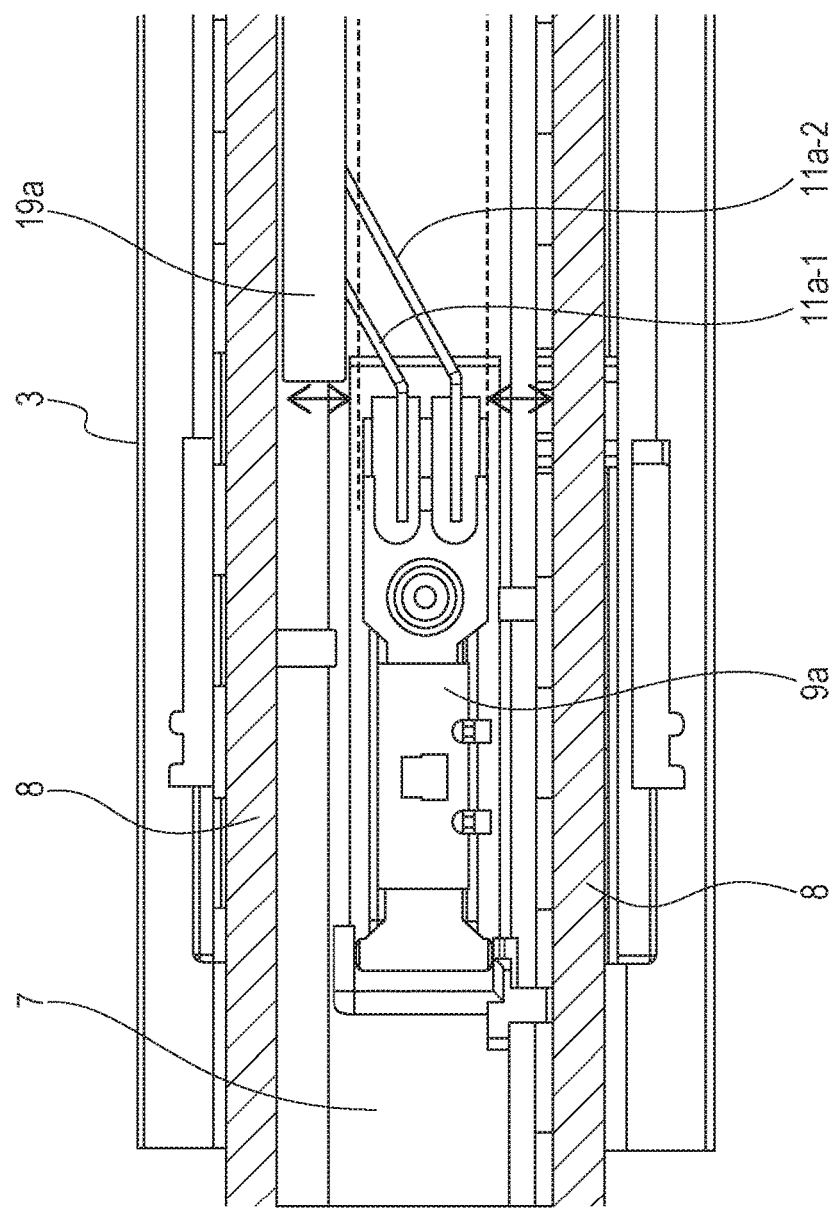
FIG. 18 is an enlarged view of the vicinity of the sensor.
Figure 19:
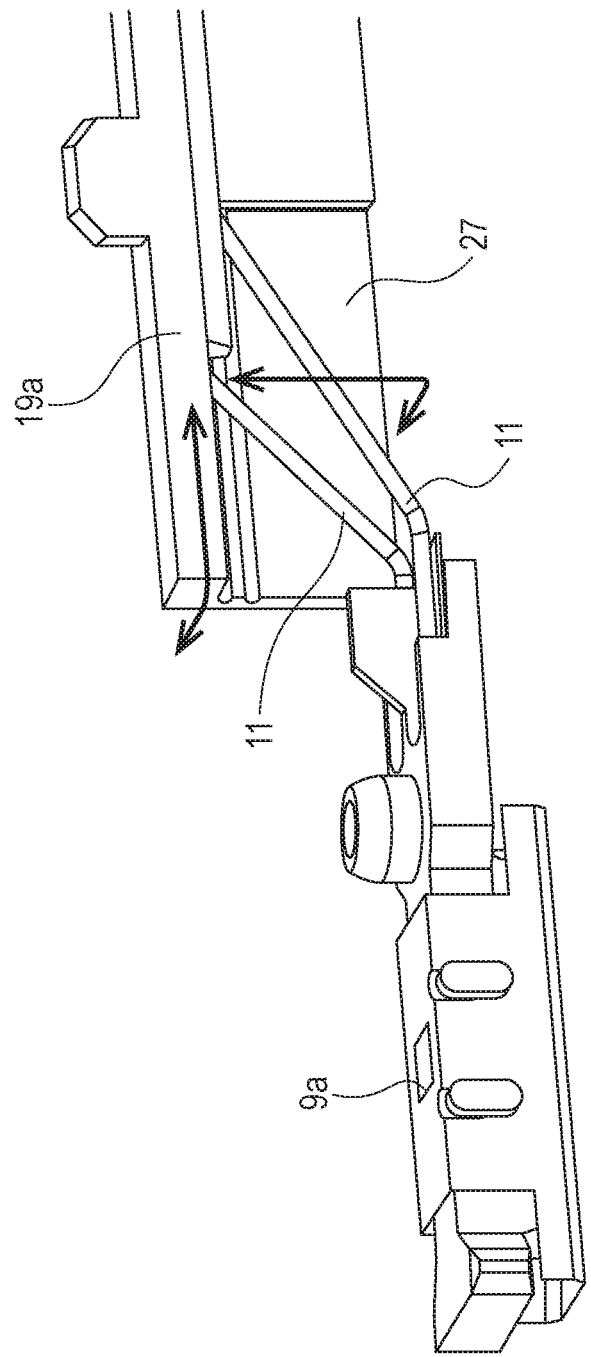
FIG. 19 is an enlarged view of the vicinity of the sensor.

FIG. 17 is a cross-sectional view taken along line XVII-XVII of FIG. 15. FIG. 18 is an enlarged view of the vicinity of the sensor 9a in FIG. 17, and FIG. 19 is a perspective view of the vicinity of the sensor 9a (the heater holder 7 and the frame member 8 are omitted). As described above, it is necessary to dispose all the conductive members such as the sensors 9, the thermal switch 10, the wires 11 and the like away from the frame member 8 by such a distance that insulation from the frame member 8 can be secured. In this embodiment, it is necessary to insulate all the conductive members in the area of the arrow from the frame member 8 to the broken line in FIG. 18. The wires 11 in the wire guide members 19 are insulated by resin (LCP), but, with respect to the exposed wire parts between the wire guide members 19 and the sensors 9, the insulation distance needs to be kept. Therefore, as shown in FIG. 19, with respect to the exposed parts of the wires 11, a wall-shaped insulating rib 27 is provided in a part of the wire guide member 19a so as to secure the insulation distance (creep age distance) as indicated by arrows. For the other sensors 9b, 9c, and 9d, and the thermal switch 10, the insulation distance is similarly secured. As described above, the first and second wire guide members are each configured by combining two resin portions, and the boundary surface between the two resin portions is located on the side opposite to the surface facing the frame member 8.

Example Assembly Configuration

Figure 20:
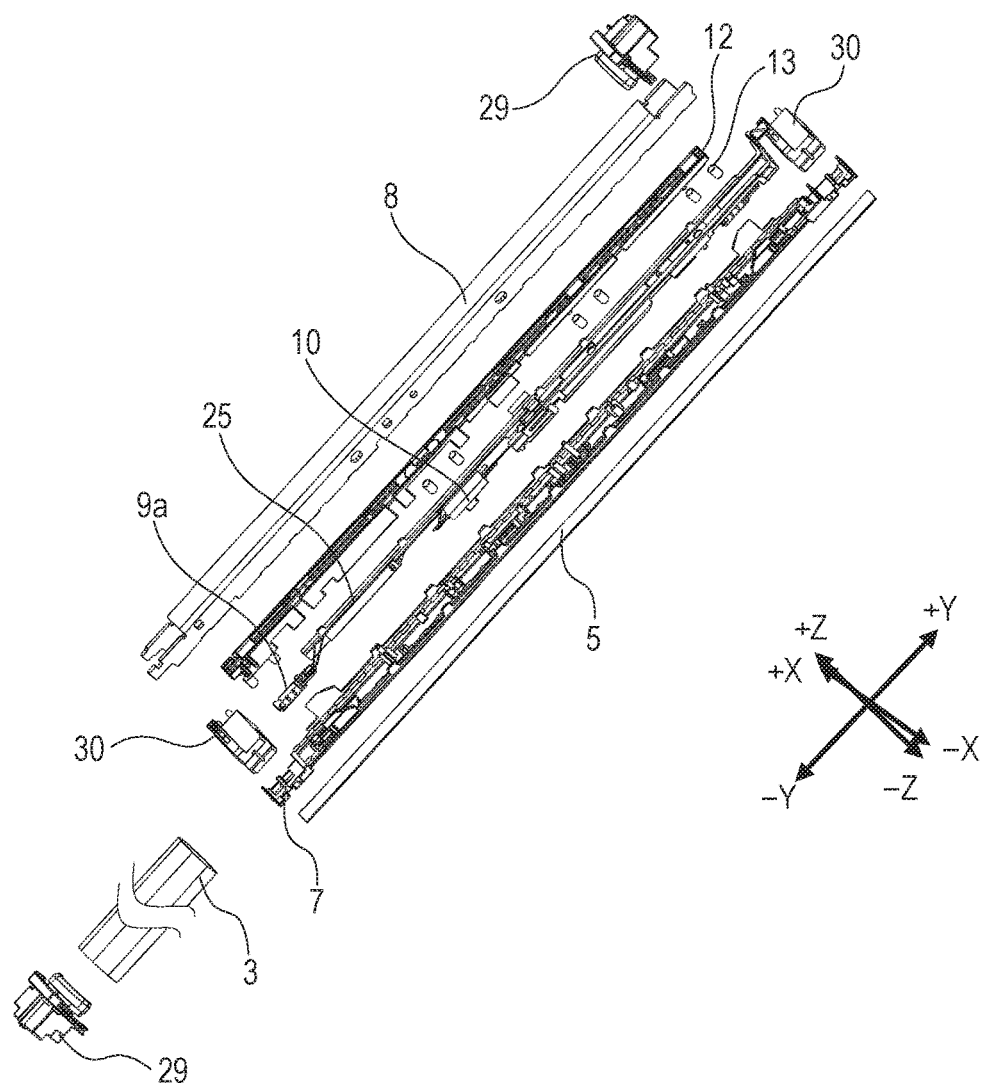
FIG. 20 is an exploded view of the heating unit.

Next, the assembly configuration of the fixing device 1 will be described with reference to FIG. 20. FIG. 20 is a view showing a state before assembling each component to the heater holder 7 disposed in the internal space of the fixing film 3. The unit (sensor unit) 25 of the wire guide member holds the sensors 9a, 9b, 9c, and 9d and the thermal switch 10. Since the sensors 9a, 9b, 9c, and 9d and the thermal switch 10 are unitized by the wire guide members 19a and 19b, it is possible to dispose a plurality of elements easily on the heater holder 7. In addition, it is possible to eliminate the step of attaching electrical cables having a wire insulation, which are difficult to handle, to the guide member.

In this embodiment, the sensors 9 and the thermal switch 10 are joined to the wire guide members 19 to constitute the sensor unit 25, and then the sensor unit 25 is placed on the heater holder 7. However, the sensors 9 and the thermal switch 10 may be disposed on the heater holder 7, and the sensors 9 and the thermal switch 10 may be joined to the wire guide members on the heater holder 7. This makes it easy to deal with assembly using an automatic assembling machine.

As described above, according to this embodiment, it is possible to provide a compact fixing device with reduced cost of wiring including electrical cables. In particular, since the ends 22 of the wire guide members 19 in which the wires 11 are sealed are located outside the fixing film 3, it is possible to provide a fixing device that is space-saving and capable of reducing the manufacturing cost.

Example Embodiment 2

Figure 21A:
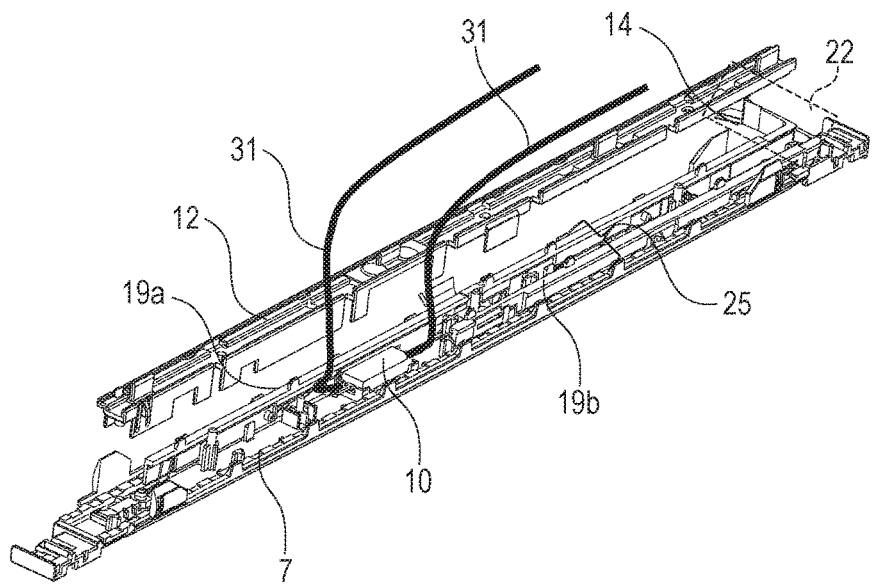
FIGS. 21A and 21B are perspective views of an example heating unit of Embodiment 2.
Figure 21B:
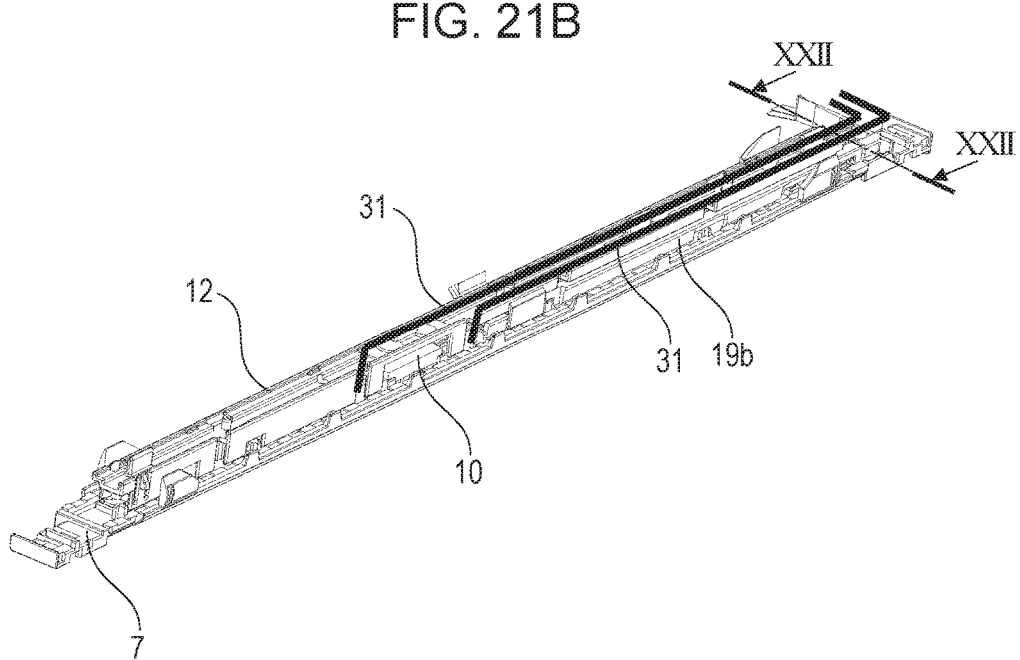

A fixing device of Embodiment 2 will be described with reference to FIGS. 21A to 23. The same reference numerals are given to members having the same functions as those of Embodiment 1, and description thereof is omitted. FIGS. 21A and 21B are configuration diagrams of the inside of the fixing film 3 of the device of this embodiment. In Embodiment 1, a thermal switch 10 of DC circuit is used. On the other hand, in this embodiment, a thermal switch 10 of AC circuit is used.

FIG. 21A is a view before the guide member 12 is attached to the heater holder 7 on which the sensor unit 25 having the wire guide members 19a and 19b is disposed. FIG. 21B is a view after the guide member 12 is attached to the heater holder 7. Five wires 11 are wired in the wire guide member 19a and three wires 11 are wired in the wire guide member 19b. These wires 11 are connected to the sensors 9a to 9d. Electrical cables 31 having a heat-resistant wire insulation are joined to the terminals of the thermal switch 10. The joint portions between the thermal switch 10 and the electrical cables are disposed such that the insulation distance from the frame member 8 and the wires 11 is kept. The ends 22 of the wire guide members are disposed so as to be located outside the fixing film 3, and the wires 11 are connected to the relay conductive members 14 outside the fixing film 3.

Figure 22:
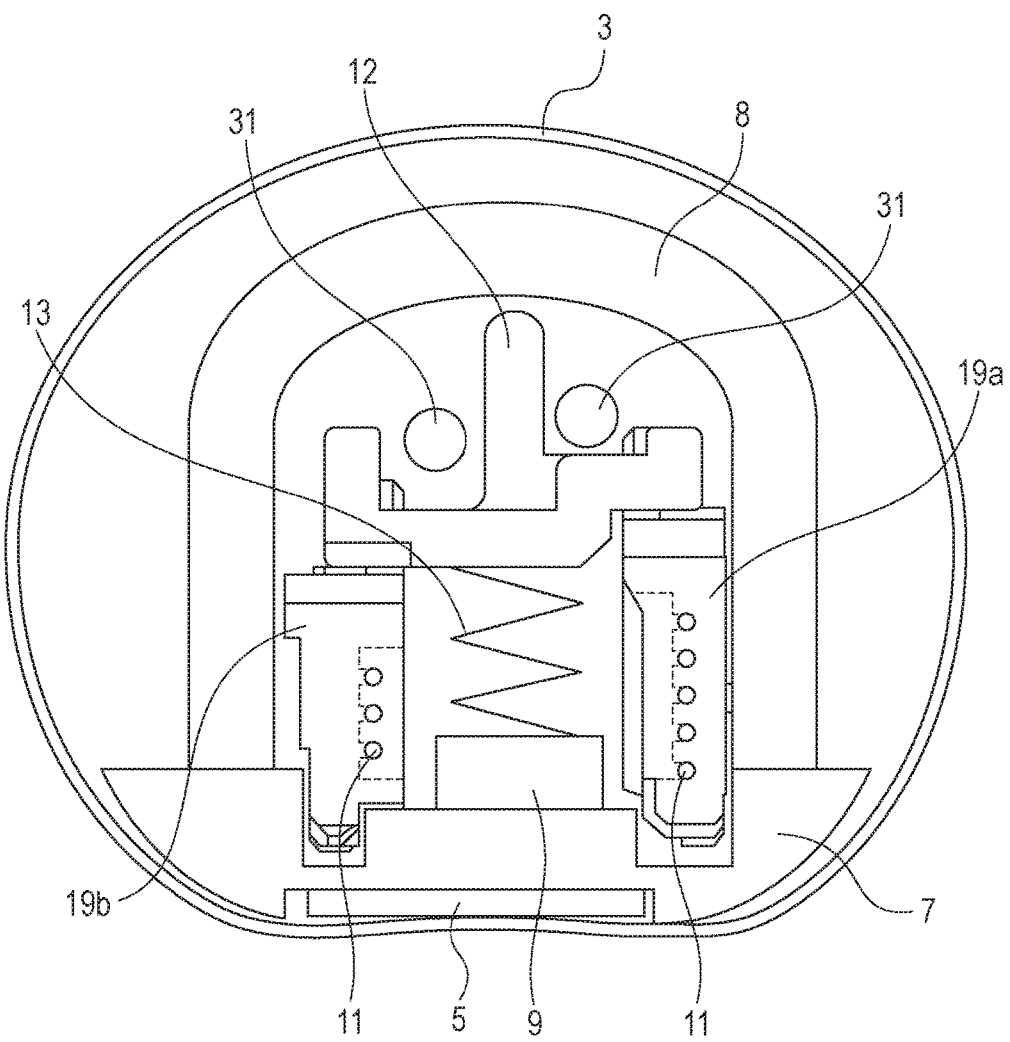
FIG. 22 is a cross-sectional view of the heating unit of Embodiment 2.
Figure 23:
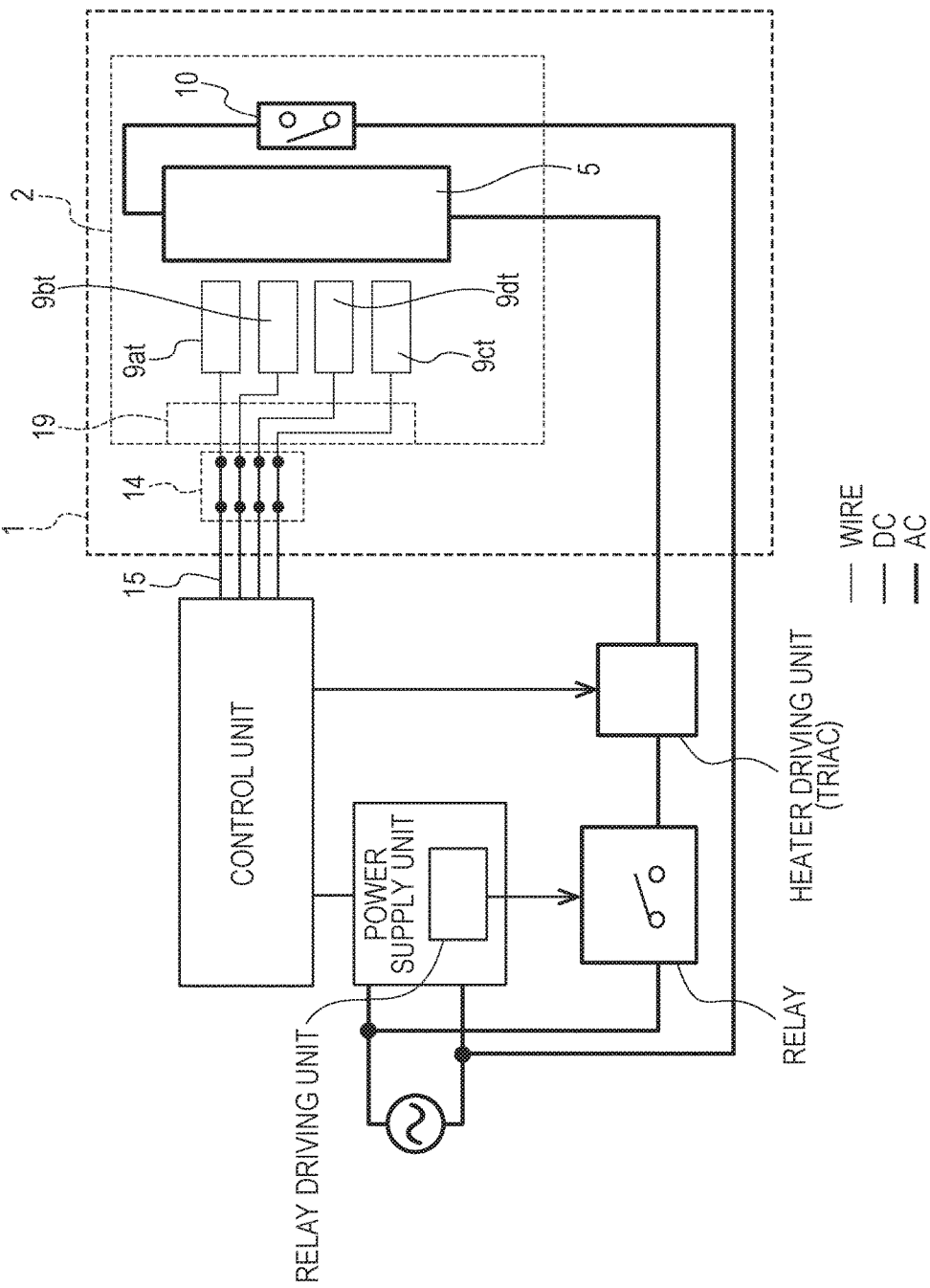
FIG. 23 is a circuit diagram of the heating unit of Embodiment 2.

FIG. 22 shows a cross-sectional view taken along line XXII-XXII of FIG. 21B. As shown in FIG. 22, by wiring the electrical cables 31 above the guide member 12, it is possible to dispose the pressing springs 13 pressing the sensors 9 with no problem. FIG. 23 shows a circuit of the heating unit of Embodiment 2. As shown in the figure, the thermal switch 10 is disposed in a power supply path (AC circuit) to the heater 5.

As described above, even with a configuration in which the thermal switch 10 is provided in the AC circuit and only the wires of the thermistors 9at, 9bt, 9ct, and 9dt are held by the wire guide members 19a, 19b, it is possible to provide a compact fixing device with reduced cost of wiring including electrical cables 31. In particular, since the ends 22 of the wire guide members are disposed so as to be located outside the fixing film 3 and are connected to the relay conductive members 14 outside the fixing film 3, it is possible to provide a fixing device that is space-saving and capable of reducing the manufacturing cost.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-128953 filed Jun. 30, 2017, which is hereby incorporated by reference herein in its entirety.

What is claimed is:

1. A fixing device comprising:
    a tubular fixing film;
    a heater in contact with an inner surface of the fixing film;
    a temperature detection element that detects the temperature of the heater; and
    a safety element that, when the temperature of the heater rises to an abnormal degree, operates by the heat and interrupts power supply to the heater,
    wherein an unfixed toner image formed on a recording material is fixed to the recording material by the heat of the heater through the fixing film, and
    wherein first and second wire guide members that seal a part of wires electrically connected to terminals of the temperature detection element and a part of wires electrically connected to terminals of the safety element are disposed in an internal space of the fixing film.

2. The fixing device according to claim 1,
    wherein at least one of the first and second wire guide members has a length such that the end thereof extends to the outside of the fixing film in a longitudinal direction of the fixing film.

3. The fixing device according to claim 1,
wherein at least one of the temperature detection element and the safety element has two terminals that are connected to a wire sealed in the first wire guide member and a wire sealed in the second wire guide member.

4. The fixing device according to claim 1,
wherein at least one of the temperature detection element and the safety element has two terminals that are both connected only to wires sealed in one of the first and second wire guide members.

5. The fixing device according to claim 1,
further comprising a metal frame member provided in the internal space of the fixing film,
wherein the first and second wire guide members are each configured by combining two resin portions, and a boundary surface between the two resin portions is located on the side opposite to the surface facing the frame member.

6. The fixing device according to claim 1,
further comprising a relay provided in a power supply path to the heater,
wherein when the safety element is turned OFF by heat caused by abnormal temperature rise of the heater, a power supply to the relay is cut off, the relay is turned OFF, and the power supply to the heater is interrupted.

7. The fixing device according to claim 1,
wherein the first and second wire guide members are made by of liquid crystal polymer.

8. A fixing device comprising:
a tubular fixing film;
a heater arranged in an internal space of the fixing film and in contact with an inner surface of the fixing film along a longitudinal direction of the fixing film;
a temperature detection element that detects the temperature of the heater; and
a safety element that, when the temperature of the heater rises to an abnormal degree, operates by the heat and interrupts power supply to the heater,
wherein an unfixed toner image formed on a recording material is fixed to the recording material by the heat of the heater through the fixing film, and
wherein a first wire guide member that seals two wires electrically connected to two terminals of the temperature detection element and a wire electrically connected to one terminal of the safety element and a second wire guide member that seals a wire electrically connected to another terminal of the safety element, are disposed in the internal space of the fixing film.

9. The fixing device according to claim 8,
further comprising a second temperature detecting element that detects the temperature of the heater,
wherein the second wire guide member seals two wires electrically connected to two terminals of the second temperature detection element.

10. The fixing device according to claim 8,
wherein at least one of the first and second wire guide members has a length such that the end thereof extends to the outside of the fixing film in the longitudinal direction of the fixing film.

11. The fixing device according to claim 8,
further comprising a metal frame member provided in the internal space of the fixing film,
wherein the first and second wire guide members are each configured by combining two resin portions, and a boundary surface between the two resin portions is located on the side opposite to the surface facing the frame member.

12. The fixing device according to claim 8,
further comprising a relay provided in a power supply path to the heater,
wherein when the safety element is turned OFF by heat caused by abnormal temperature rise of the heater, a power supply to the relay is cut off, the relay is turned OFF, and the power supply to the heater is interrupted.

* * * * *